Dec. 4, 1951 M. L. SCHULTZ ET AL 2,577,368
COLOR TELEVISION RECEIVING APPARATUS
Filed Feb. 14, 1950 5 Sheets-Sheet 1

INVENTORS:
Mortimer L. Schultz,
Louis J. Pacent and
Ralph R. Batcher,
BY Dawson, Ooms, Booth and Spangenberg,
ATTORNEYS.

COLOR TELEVISION RECEIVING APPARATUS

Filed Feb. 14, 1950 5 Sheets-Sheet 2

INVENTORS:
Mortimer L. Schultz,
Louis G. Pacent and
Ralph R. Batcher,
BY Dawson, Ooms, Booth and Spangenberg
ATTORNEYS.

COLOR TELEVISION RECEIVING APPARATUS

Filed Feb. 14, 1950

INVENTORS:
Mortimer L. Schultz,
Louis G. Pacent and
Ralph R. Batcher,
BY Dawson, Ooms, Booth and Spangenberg,
ATTORNEYS.

COLOR TELEVISION RECEIVING APPARATUS

Filed Feb. 14, 1950 5 Sheets-Sheet 4

INVENTORS:
Mortimer L. Schultz,
Louis J. Pacent and
Ralph R. Batcher,
BY Dawson, Ooms, Booth and Spangenberg,
ATTORNEYS.

INVENTORS:
Mortimer L. Schultz,
Louis G. Pacent and
Ralph R. Batcher,
BY Dawson, Ooms, Booth and Spangenberg,
ATTORNEYS.

Patented Dec. 4, 1951 2,577,368

UNITED STATES PATENT OFFICE 2,577,368

COLOR TELEVISION RECEIVING APPARATUS

Mortimer L. Schultz, Plainfield, N. J., and Louis G. Pacent, Little Neck, and Ralph R. Batcher, Douglaston, N. Y., assignors to Charles Doerr, Newark, N. J., as trustee Application February 14, 1950, Serial No. 144,168

5 Claims. (Cl. 178—5.4)

Figure 1:
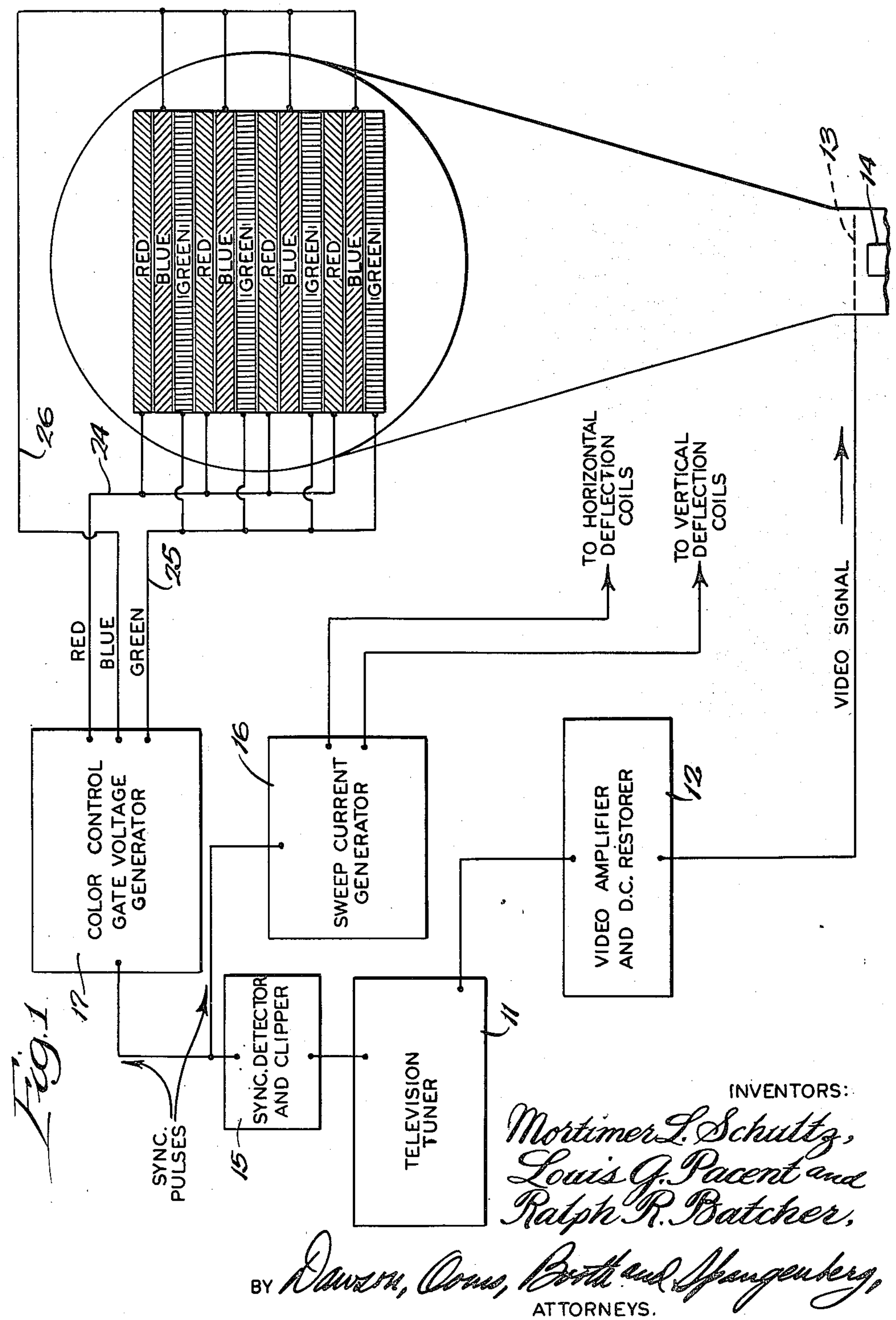

This invention relates to apparatus for receiving color television signals; in particular, it concerns a receiving system which provides complete freedom from mechanical moving parts and at the same time offers greater certainty of color coordination and simpler apparatus than previously existing electronic systems could offer.

So far as we are aware, all color television systems involve transmitting separately the primary color components—that is, red, green, and blue—of the scene being scanned by the television camera or cameras. At the receiver the separate color components are combined to present on a single field the sum of the component colors. The eye of the observer then mixes the three colored pictures to form and transmit to the observer's brain an impression of a single picture containing the entire color spectrum.

Prior-art systems of color television have differed from one another in the manner of separating and re-combining the three primary color components. The separate color components can be transmitted simultaneously on distinct channels; or, alternatively, the facilities of a single channel can be divided by time intervals, the red component being transmitted for a given interval, then the green, then the blue, and so on. Due to the simpler receiving and transmitting apparatus required, as well as other considerations, systems involving sequential color transmission have definite advantages over systems involving simultaneous transmission of colors. The present system which embodies our invention is a sequential system; as will be hereinafter more fully explained, it can be readily adapted for any of the three principal sequential systems—that is, sequential line, sequential dot, or sequential field.

In sequential line systems, a single scanning line of one color is transmitted, followed by a line of another color, then by a line of the third color, and so on.

Sequential dot systems involve transmission of a given color for a very brief time interval (substantially less than the time required for a single horizontal scanning operation), followed by transmission of the other colors in sequence for equal periods of time.

Sequential field systems of color television involve scanning the entire objective field in one color, followed by scanning the entire field in a second color, then a third, and so on.

While we prefer sequential line scanning, the system of television reception which we have invented and herein describe is adaptable to any of the three sequential systems just mentioned by simple modification of the apparatus. Thus, while we have herein shown and described in detail a system for sequential line operation, we do not desire to be thus limited in the scope of our invention.

No truly satisfactory system of color television has been developed prior to the present invention. The difficulties encountered have been almost entirely concerned with reception and recombination of the separate color components of the transmitted picture. Transmission of color television has not involved any great problem. In general, transmission has been accomplished by the use of three television cameras equipped respectively with red, green, and blue color filters. Since neither expense nor complication of apparatus is particularly objectionable at the transmitting end, this three-camera system has been generally satisfactory. The task of electronic switching involved in cutting the respective cameras into and out of the circuit in synchronism with the scanning has been well within the power of prior-art apparatus. Accordingly, it may be fairly said that the transmission of color television has been satisfactorily accomplished.

Reception, on the other hand, has presented very serious difficulties. One system of reception which has received extensive notice involves the use of a rotating disc which turns within the receiver in front of the picture tube. This system requires that the color disc of each receiver be mechanically rotated in precise synchronism with the shifts in color in the received video signal. That is, during all the intervals in which signals from the "red" camera are being received, the red sector of the color disc must be in front of the picture tube. Similarly, the green and blue sectors must cover the face of the tube while "green" and "blue" video signals are being received. Synchronizing pulses are, of course, transmitted for the purpose of synchronizing the spinning discs in the receivers, but synchronization of a rapidly rotating disc, driven by an electric motor, is not easy to accomplish. The results when the color disc is out of synchronization are grotesque, since color values are altered and frequently shift back and forth, creating a kaleidoscopic effect.

It is, we believe, the opinion of many persons skilled in the art that no system of color television employing mechanically moved parts in the receiver will ever be practical.

Other systems of color television reception heretofore proposed have dispensed with the mechanical scanning disc by using three cathode-ray tubes or, alternatively, a single cathode-ray tube on which three images are "painted" side by side as the cathode ray traverses the viewing screen.

The three picture tubes, or the three images on a single picture tube, depict respectively the red, blue, and green components of the objective field being transmitted. These three components are re-combined into a single image at the receiver by an optical system. These systems of color television reception, while probably offering more promise than the mechanical scanning systems, are exceedingly expensive. The accuracy of registration required to impose accurately the three separate images calls for very fine optical glass and extremely precise grinding and adjustment of lenses and prisms. It is difficult to see how color television receivers employing such systems can ever be brought into a reasonable price range.

Our system of reception has distinct and important advantages over the prior-art systems from the point of view of simplicity of apparatus and economy of manufacture. Our system requires a specially designed and constructed picture tube which, made in quantities, would not be materially more expensive than the present picture tubes. Apart from the special picture tube, the additional electronic apparatus required for our system, over that required in black and white receivers, is quite small in extent. A receiver employing our system, it is true, must be provided with power supplies capable of maintaining voltages constant within narrow limits, and the sweep circuits must be designed to provide a high degree of linearity, particularly in the vertical sweep. These requirements, however, are prerequisites for any color television reception and obviously are highly desirable for a television receiver of any sort, whether or not designed for color reception.

A particularly valuable feature of our system of color television reception is that it can be adapted for receiving signals transmitted in accordance with any of the pre-existing time-division or sequential color television transmitting systems. In other words, its adoption in place of the previously used, unsatisfactory receiving apparatus would not render obsolete the existing transmitting facilities. In our system, a color coordination pulse must be transmitted at frequent intervals, but such coordination pulses are transmitted in all prior-art systems, so that that requirement is in no way burdensome, so far as modifying existing transmitting facilities is concerned.

Our system of reception involves the use of a picture tube in which the viewing screen is provided with laminations or narrow zones wherein light of a particular color is transmitted to the viewer when the zone in question is bombarded by a cathode ray. The production of colored light from the ray bombardment can be accomplished in various ways. All the zones may be coated with conventional phosphor, suitable dyestuff or filter material being interposed between the phosphor and the viewer's eye to give each zone the desired color. Alternatively, the successive zones may be coated with phosphor designed to give off light of a particular color—red, green, or blue, as the case may be.

Color television systems involving the use of laminated multi-color screens are not broadly new; no such system has ever been practical or successful in the past, however, due to the impossibility of controlling the position of the cathode ray with sufficient accuracy to insure that it woud always strike a line of the desired color at a given instant. Moreover, focusing of the beam with sufficient accuracy to prevent spill-over of the beam onto adjacent color lines was impossible, with the result that serious blurring occurred due to unintended excitation of blue and green lines when red was being transmitted, etc.

In the present system of reception, we have provided a multi-color screen with positive control means to insure that the beam at any given instant is (*a*) striking a line of the desired color and (*b*) not falling on or exciting lines of any other color. The result is a color television receiving apparatus in which the proper color values are maintained at all times and in which good color pictures are provided with relatively simple electronic apparatus and complete freedom from mechanical moving parts.

It may accordingly be stated that a major object of the present invention is to provide a color television receiving apparatus employing a cathode-ray tube the viewing screen of which is laminated to provide a series of zones each of which is treated to give off light of a particular color upon being bombarded by a cathode ray.

Another object of our invention is to provide a color television receiving apparatus of the general character just described in which color television is accomplished by positively directing the cathode ray in such manner that it will strike a zone which gives off light of a particular color during all times in which video signals associated with that color are being received.

Another object of our invention is to provide a system of color television reception in which electric-field beam guides are employed in the cathode-ray picture tube to compel the electron beam during any given sweep to fall upon a zone treated to give off light of a predetermined color.

A still further object of our invention is to provide a color television reception system in which positive means are provided to insure maintenance of correct color values and which can be equally well adapted to sequential line, sequential dot, or sequential field color presentation.

A still further object of our invention is to provide a receiving apparatus for color television signals which is entirely free from mechanical moving parts.

In the accompanying drawings, we have disclosed an illustrative embodiment of our invention, comprising apparatus adapted for the reception of color television signals transmitted in the usual primary colors on a sequential-line basis. In the interest of avoiding unnecessary complication, block diagrams have been employed to represent conventional electronic circuit components, and no treatment of interlacing in the scan has been undertaken. In other words, the disclosure proceeds on the assumption that each successive sweep takes place across the scanning field one line or color zone below the immediately preceding sweep. The modification of our system to encompass interlaced scanning is very simple, and will be treated herein after the explanation of the illustrated embodiment. While interlaced scanning will normally be employed in any commercial adaptation of our invention, comprehension of the principles of our invention is somewhat easier when it is considered without bringing in interlacing as a complicating factor.

Figures 2, 3, 4, 5:
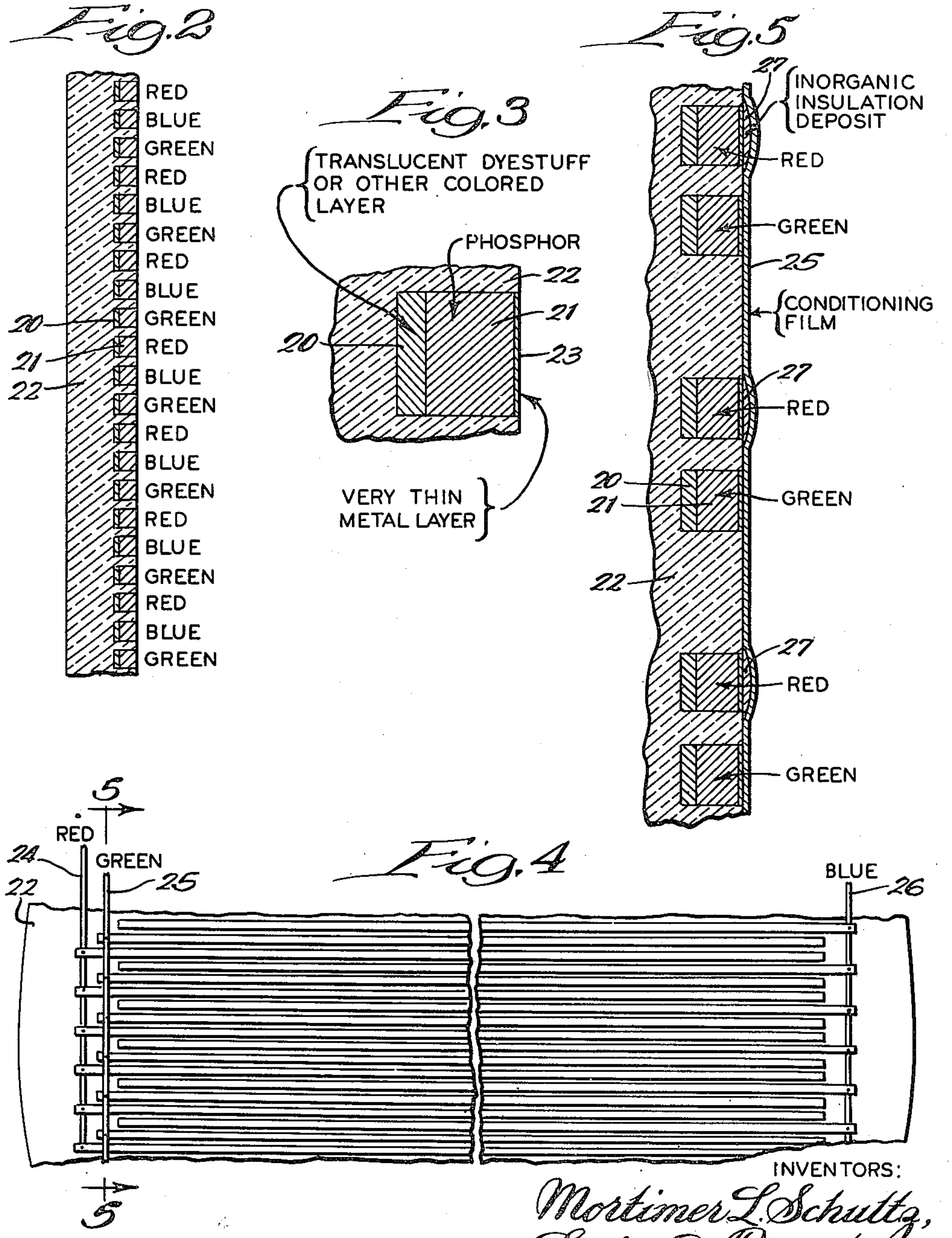
Figure 6:
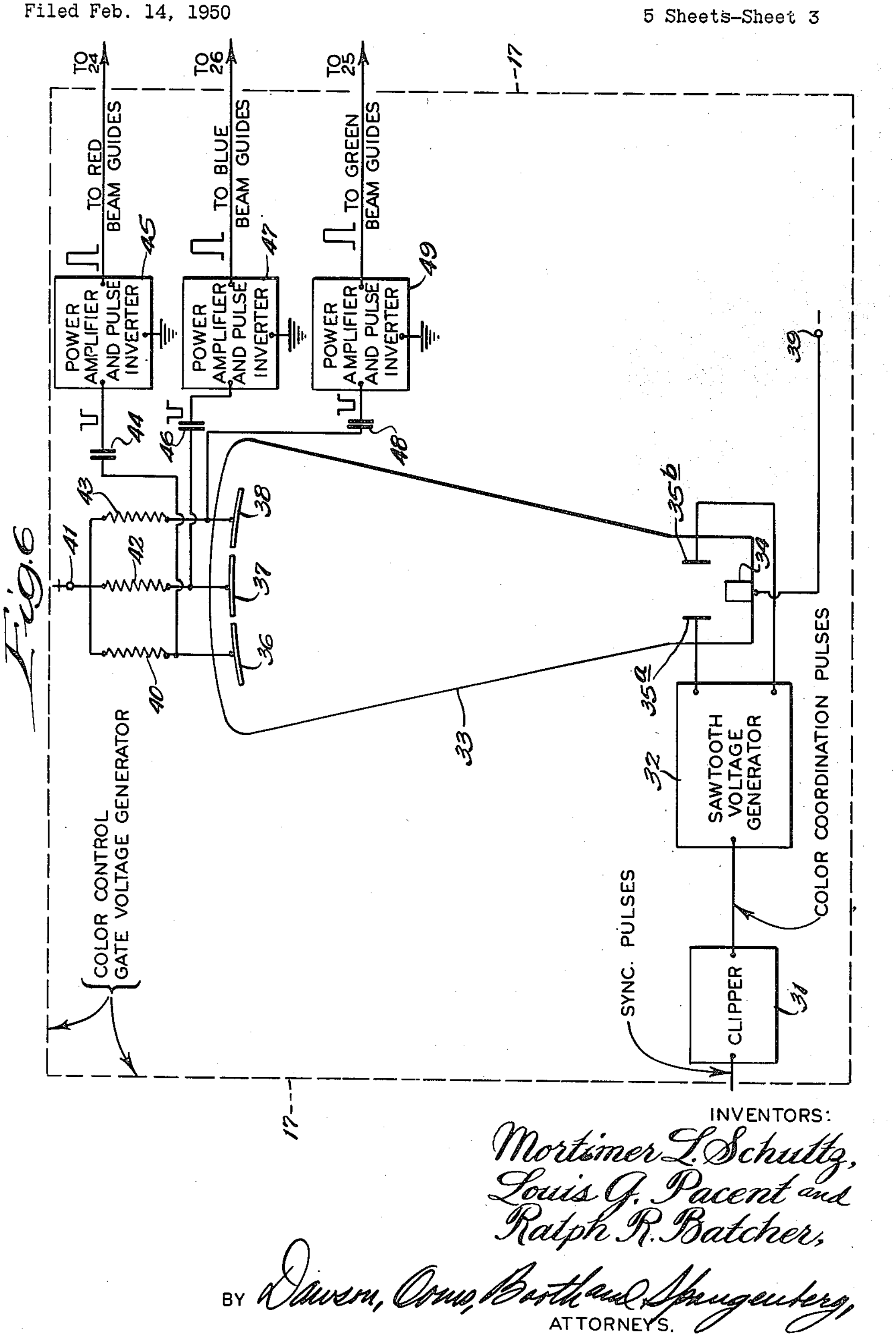
Figure 7:
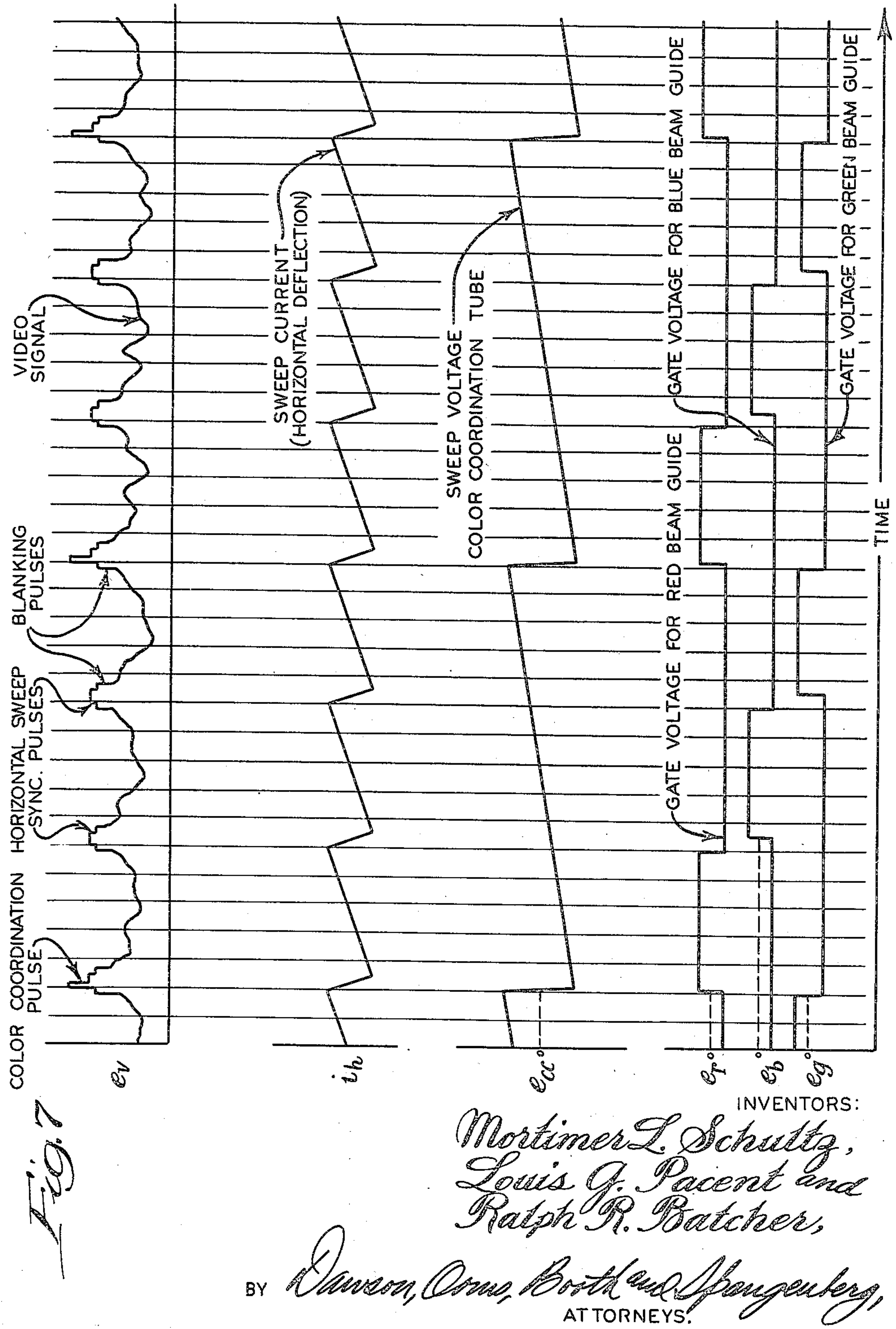
Figure 8:
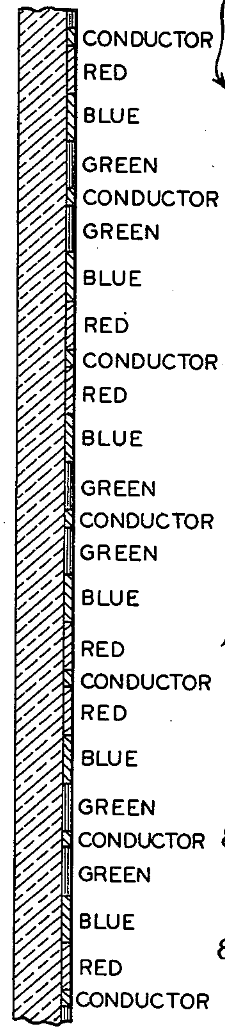
Figure 9:
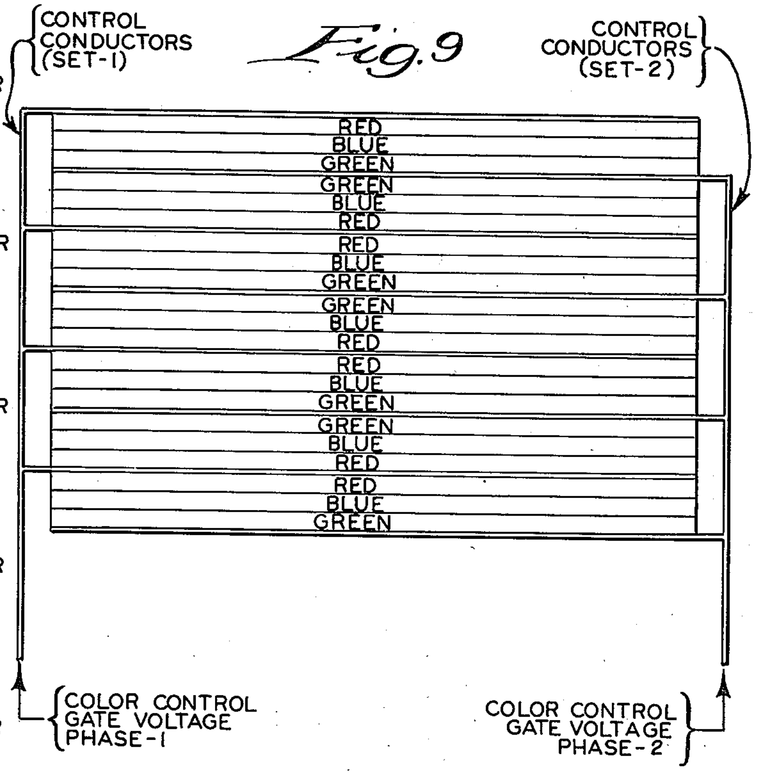

In the drawing, Figure 1 is a diagrammatic showing, largely in block diagram, of a color television receiver employing our invention; Fig. 2, a greatly enlarged cross-sectional view of a portion of the viewing screen of a television picture tube embodying our invention; Fig. 3, a very greatly enlarged sectional view of a portion of the viewing screen of the cathode-ray tube of Figs. 1 and 2, showing the structure of an individual "lamination" or "color zone"; Fig. 4, a fragmentary, greatly enlarged view of the screen of our distinctive cathode-ray tube, showing a number of the color zones and the manner in which electrical connections are made thereto; Fig. 5, a greatly enlarged sectional view of our cathode-ray tube screen, taken along the line of 5—5 in Fig. 4, showing in further detail the electrical connections to the color zones; Fig. 6, a diagrammatic and schematic view of the color-control gate-voltage generator, which is one of the block elements of Fig. 1; Fig. 7, a graph drawn with time as the abscissa and showing, to a common time scale, several of the varying voltages and currents which are critically involved in the operation of the illustrated embodiment of our invention; Fig. 8, a cross-sectional view, greatly enlarged, of a fragment of the viewing screen of a modified form of cathode-ray tube which may be employed in our invention as an alternative to that shown in the preceding figures; Fig. 9, a semi-diagrammatic elevation view of, as viewed from the electron gun, a portion of the viewing screen of the tube of Fig. 8, showing the color zones, their orientation, and the orientation of the control conductors; and Fig. 10, a graph, with time as abscissa, showing to a common time scale certain varying voltages and currents involved in the operation of the modified cathode-ray tube of Figs. 8–9.

A basic feature of our invention consists in using for color television reception a cathode-ray tube the viewing screen of which is made in the form of a very large number of parallel "color zones," the width of each individual zone being extremely minute and their separation one from another being very slight. In the simplest case the cathode-ray tube would have one color zone for each scanning line, although in some cases, as we explain more fully hereinafter, it might be desirable to construct the tube with a different number of color zones, such as, for example, a number of zones equal to three times the number of scanning lines.

In present-day television systems, the scanning sweep is normally horizontal, and, accordingly, the zones in our cathode-ray tube will normally be narrow, parallel, horizontal strips of phosphor, each strip being treated to present to the viewer light of a primary color.

The exact number of color zones on the face of our cathode-ray tube will, of course, be governed by the number of scanning lines employed at the transmitter. While 525 lines are conventional in the television transmitting systems presently in use in the United States, it seems probable that a greater number of lines will be employed in the future, as higher carrier frequencies are adopted for television broadcasting and wider channels thus become available.

The respect in which our system differs from earlier, unsuccessful efforts to achieve color television by the use of a laminated, multi-color screen is that in our cathode-ray tube electrical connections to the screen itself (or to the neighborhood of the screen) have been provided to permit the use of electric charges as beam guides to direct the cathode ray specifically to the particular zone which it is supposed to be traversing on any given sweep.

In our preferred embodiment, disclosed in Figs. 1–7 inclusive, we employ a cathode-ray tube in which the successive parallel zones are "metalized" by the deposit on each of a very thin, essentially mono-molecular layer of metal over the phosphor. The use of a thin metal layer over the phosphor deposit of a cathode-ray tube screen is not novel with us; it has been employed widely as a means of preventing unwanted electrostatic charges on the screen and insuring that electrons caught by the screen are quickly returned to the cathode. In our system, however, the metalizing of the individual color zones serves a novel and critically important function in that it makes possible selective charging of the color zones on the tube screen. The manner of construction of our preferred form of cathode-ray tube is brought out clearly in Figs. 2–5 inclusive. As may be seen from those figures, all of which are greatly enlarged, although the degree of enlargement varies from figure to figure, the inner surface of the viewing screen is scored with a large number of narrow, parallel recesses or slots. The size and separation distance of these slots will, of course, depend on the overall size of the screen. In a tube which lies within the range of sizes currently employed in home television receivers, the width of the individual slots will normally be of the order of two or three hundredths of an inch, the separation between slots being a few thousandths of an inch. The formation of accurately controlled slotted surfaces of the type contemplated by us is well within the capabilities of present-day glass processors; in fact, the requirement for our cathode-ray tube is relatively crude as glass-cutting standards go, since glass defraction gratings have been made with accurate scoring up to many thousands of lines per inch.

We have, in the drawings, shown the individual slots as being rectangular in cross-section. While this is the preferred form, it will be understood that the slots may be made with tapered or rounded sides if desired.

In our preferred cathode-ray tube, we employ filter material as a means of giving the desired color to the light given off by the phosphor, employing in conjunction with the filter material standard phosphor solutions giving off white light when excited by a cathode ray. We prefer this technique of generating our colored light for the reason that phosphors giving off colored light vary greatly one from another in sensitivity, so that much more stimulation, for instance, is required to give off a specified quantity of red light from red-glowing phosphor than is required to produce an equal quantity of light from green-glowing phosphor. If, therefore, phosphors are used which directly generate colored light, the intensity of the transmitted video signal must be carefully adjusted so as to provide much greater beam intensities for lines of one color than for those of another. Since such a requirement calls for added complexity in the transmitting equipment, we prefer that the use of multi-colored phosphors be avoided. A tube according to our invention could readily be made with such phosphors, however, and we do not limit ourselves to the particular form shown in which white phosphor is used in conjunction with color filter material.

As shown best in Fig. 3, our preferred form of cathode-ray tube contains, in each of the slots or color zones, a base layer 20, deposited at the bottom of the slot, of translucent dyestuff or other colored material. The colored gelatins used for ordinary color filters are not advisable for this purpose, due to the likelihood of gas emission from any organic material confined within an evacuated space. Accordingly, inorganic dyes are preferable.

Filling the major portion of each slot and resting on the bottom layer of colored material is a layer 21 of phosphor compound of the sort generally used in cathode-ray tubes for generating white light upon stimulation by a cathode ray.

At the extreme top of the slot, substantially flush with the glass 22 separating the individual slots is a layer 23 of metal. This layer is deposited on the phosphor by evaporation or other means and is, as with present-day metalized tubes, extremely thin.

As may be noted from Fig. 2, the slots in our preferred tube design are treated to provide successive colors in regular sequence—that is red, blue, green, red, blue green, etc. As is shown best in Fig. 4, the slots containing dyestuff of a particular color are extended beyond the limits of the viewing screen proper and are there electrically connected together by a deposited metallic strip 24; in the illustrated case, we have denoted conducting strip 24 as connecting together all the "red" zones or slots. Similarly, all the slots containing another particular color dyestuff are extended from the other end of the viewing screen and are connected together by a conducting strip 26; in the drawing, we have denoted conductor 26 as connecting all the "blue" slots or zones together; the slots or zones carrying the dyestuff of the third primary color—in the illustrated case, green—are extended from one end of the viewing screen but not quite so far as those of the first-mentioned color—in the illustrated case, red. The slots of the third color (green, as shown) are connected together by a layer of conducting material 25 deposited over the inner face of the screen. In order to prevent conducting strip 25 from short-circuiting all the red zones to the green zones, each of the red zones, prior to deposit of strip 25, is covered, in the portion immediately under strip 25, with an inorganic insulation deposit of some such material as a silicone plastic, and conducting strip 25 is then deposited over the inner surface of the tube face as shown in Fig. 5. Deposit 25 makes contact with and connects together electrically all the green slots, as shown, but is insulated from and does not connect electrically to the "red" slots.

The construction detailed in the foregoing paragraphs and illustrated in Figs. 2–5 permits bringing out to external connectors conducting strips 24, 26, and 25, and thus permits application of controlled electrical potentials to the red zones, the blue zones, or the green zones, as may be appropriate.

Referring now to Fig. 1, we shall review the block diagram of our television receiving apparatus. As may be noted from Fig. 1, our cathode-ray tube is diagrammatically illustrated therein, a few of the color zones being shown for purposes of illustration and being electrically connected in such manner that all the red zones are connected together, all the blue zones connected together, and all the green zones connected together. This diagrammatic representation of the cathode-ray tube of Figs. 2–5 is carried out by the use of the designating numerals 24, 26, and 25 to denote respectively the leads running to the red, blue, and green zones.

We have shown in block form in Fig. 1 a television tuner 11 which may be in all respects conventional, consisting of the usual R-F amplifier, mixer and local oscillator, I-F amplifier, and detector. A video amplifier and D.-C. restorer circuit 12, also conventional, generates a video signal which is fed to the control grid 13 of our cathode-ray tube.

It will, of course, be understood that our cathode-ray tube is provided with an electron gun 14, the usual accelerating anodes, and the customary magnetic coils for focusing and for horizontal and vertical beam deflection.

A detector and clipper circuit for the synchronizing pulses is shown on the drawing in block form and denoted 15. The output of this circuit 15 is, as is conventional, fed to sweep current generator 16 for the purpose of controlling and synchronizing with the received signal the horizontal and vertical deflection of the cathode ray. As indicated on the drawing, the output of sweep current generator 16 is fed to the horizontal and vertical deflection coils. Since the apparatus in blocks 11, 12, 15, and 16 is wholly conventional, we shall not discuss their structure in detail.

The output of the synchronizing signal detector and clipper 15 is also fed to color-control gate-voltage generator 17, shown in detail in Fig. 6 and to be fully described hereinafter. Gate-voltage generator 17 is provided with three independent outputs, one of which is connected to the red color zones of the cathode-ray tube via conductor 24, another of which is connected to the blue color zones via conductor 26, and the third of which is connected to the green color zones via conductor 25. The signal provided at each of the outputs of gate-voltage generator 17 is rectangular in waveform, varying between a substantial positive value and an approximately equal negative value. The gate-voltage outputs of generator 17 are shown graphically on Fig. 7 and are denoted thereon "$e_r$" for the red gate voltage, "$e_b$" for the blue gate voltage, and "$e_g$" for the green gate voltage.

The operation of our television receiving apparatus is best understood with respect to the graphic showing in Fig. 7 of the various voltages and currents, and the reader's attention is accordingly invited to that figure at this point.

The uppermost graph in Fig. 7 (denoted "$e_v$") represents the video signal received by the television tuner after amplification, detection, and D.-C. restoration. In order to show several sweep cycles on the graph, the relative time durations of the synchronizing pulses and the video signals have been radially distorted. It will be understood by those skilled in the art that the actual time duration of the video signals, transmitted between successive synchronizing pulses, is very much greater in proportion to duration of the pulses themselves than is indicated on Fig. 7. Incidentally, the video signal designated $e_v$ in Fig. 7 is shown as having positive synchronizing pulses; it will, of course, be understood that this polarity can be controlled at will, and that the signal actually applied to the grid of the cathode-ray tube will be reversed in polarity from the showing in Fig. 7. The signal as detected in the synchronizing pulse detector and clipper circuit 15 may be of either polarity, according to the design of the clipping circuits therein employed.

As may be seen from study of the video signal voltage in Fig. 7, it is conventional except for the addition to every third horizontal sweep synchronizing pulse of a superimposed pulse denoted "color coordination pulse." As shown in Fig. 7, the color coordination pulses commence at the same time as the horizontal sweep synchroniizng pulses but continue for a shorter time duration. This distinction in time duration has been introduced in Fig. 7 for purposes of permitting ready distinction between the color coordination pulses and the horizontal sweep synchronizing pulses; it will be apparent to persons familiar with the television art that there need be no distinction in duration between the two types of pulses so long as sufficient amplitude difference exists to permit ready separation, by clipping, of the color coordination pulses and the horizontal sweep synchronizing pulses.

The sweep current possesses the usual sawtooth waveform, a new cycle being initiated by each horizontal sweep synchronizing pulse. It is shown graphically in Fig. 7 and denoted "$i_h$." (It should perhaps be mentioned here, although it is well known in the art, that the blanking pulses which form a part of the video signal turn off the cathode ray and darken the tube screen during the time the synchronizing pulses are being transmitted and while the sweep retrace is occurring.)

In a sequential-line system of color television, such as is being assumed in describing the present embodiment of our invention, each sweep of the cathode ray supplies a particular color component of the picture being "painted" on the screen by the cathode ray. That is, if a given sweep be a "red" sweep, only red light should emanate from the screen during that sweep. Should the next sweep be a blue sweep, it should create blue light on the screen, and so on.

That result is accomplished in the receiving apparatus of our invention by the color-control gate-voltage generator 17 in conjunction with the electrically controlled color zones in the screen of the cathode-ray tube. As shown in Fig. 7, the red output of the gate-voltage generator 17 provides a positive charge on all the red zones during the first horizontal sweep following a color coordination pulse, and during all other time intervals supplies thereto a negative charge. The blue output of the gate-voltage generator 17 provides a positive charge on all the blue zones of the tube screen during the second horizontal sweep following each color coordination pulse; at all other times the blue output imposes on the blue zones a negative charge. The green output of gate-voltage generator 17 places a positive charge on all the green zones during the third horizontal sweep following each color coordination pulse; at all other times the green output of the gate-voltage generator 17 maintains a negative charge on the green zones. It will be understood, of course, that the terms "positive" and "negative" are used with reference to the mean potential level of the screen—normally referred to as "ground potential."

From the foregoing analysis of the gate-voltage generator's output, those skilled in the art will see that if a color coordination pulse is transmitted immediately before the video information contained in each red "line," and blue and green lines are thereupon transmitted in that order, the cathode ray will be guided in each case to a zone of the appropriate color, due to the attraction of the positively charged zone for the negative electron beam, coupled with the repelling effect of the negatively charged zones adjacent thereto. As a result the light given off by the tube will at all times correspond to the color component "sampled" or analyzed at the transmitter.

The adjacent zones are of course only a few hundredths of an inch apart, and as a result the viewer, looking at the screen from a distance of a few feet, experiences a merger of the various color components in his eye and sees a scene embracing the entire color spectrum rather than seeing the color components separately.

The vertical sweep current, being held accurately linear, will at all times insure that the cathode ray, during a particular horizontal sweep, is in the correct region of the screen; there is no technical difficulty involved in thus holding the beam in the correct vertical plane within a tolerance of a small fraction of one percent. The positive charge on the proper color zone will draw the beam to it, thus compensating for any minor error in beam orientation by the sweep current and will at the same time insure that there will be no "spill-over" onto the adjacent color zones of different hues, since the negative charge on those zones will repel the beam and urge it into the positively charged zone of the desired color.

From the foregoing it will be seen that reversal of color values can not occur with our invention. Even should the vertical sweep current be nonlinear and the beam accordingly be allowed to shift a substantial distance from the position it should occupy, it will never strike a zone of the wrong color. The effect of the beam's drifting substantially above or below its proper position is merely that some zone of the desired color other than the correct one will be illuminated. This aberration, should it occur, will result in lowered picture definition but never reversal of color values. Our electric beam guides automatically correct for minor errors in beam position, with the result that color picture reproduction is flawless so long as the vertical sweep current is sufficiently linear to hold the beam within approximately one zone width (on either side) of the correct zone. Within those limits of error, the positive charge on the correct zone, co-operating with the negative charges on the other zones, will pull the beam into the correct position for illumination of the proper zone or "line."

We shall now describe in some detail an illustrative or exemplary form of color-control gate-voltage generator. The function of the gate-voltage generator is essentially one of rapid electronic switching in response to synchronizing pulses; accordingly, in the present state of the art, numerous means of accomplishing the desired result could undoubtedly be devised. We are, in this specification, describing in some detail an illustrative electronic switching apparatus suited to perform the role of color-control gate-voltage generator in our receiving system. We do not limit ourselves to the particular embodiment shown and described.

As shown in Fig. 6, color-control gate-voltage generator 17 receives from the synchronizing signal detector and clipper 15 a wave train from which the video signals proper have been clipped but which still contains all the synchronizing pulses. This wave train is fed to a clipper 31 which removes from the train the blanking and sweep synchronizing pulses, leaving only the color coordination pulses which are received immediately before the transmission of each "red" video line. Clipper circuits well known to the art can accomplish the result just described; consequently we have shown clipper 31 in block form and shall not describe its operation in detail.

A wave train consisting only of the color coordination pulses is fed from clipper 31 to a saw-tooth voltage generator 32. Saw-tooth voltage generator 32 is also shown in block form, since its structure may be entirely conventional. Its linearity should be good, it should possess the property that a new saw-tooth cycle is commenced with each color coordination pulse fed in from clipper 31, and it should have a reasonably rapid retrace characteristic. All these characteristics can readily be obtained by any one of numerous well-known "hard tube" circuits.

The heart of color-control gate-voltage generator 17 is a special cathode-ray tube 33 which, in the illustrated embodiment, performs the function of a three-position electronic switch. Cathode-ray tube 33 is provided with an electron gun 34, deflection plates 35*a* and 35*b*, and the usual accelerating and focusing anodes (not shown) that are characteristic of cathode-ray tubes employing electric deflection.

At the end of the envelope opposite the electron gun, cathode-ray tube 33 is provided with three conducting beam targets 36, 37, and 38, arranged side by side with small separation one from another, and so oriented within the tube that the cathode ray sweeps in succession across the three targets when it is deflected from left to right by voltages applied to beam-deflecting plates 35*a* and 35*b*.

The output of saw-tooth voltage generator 32 is applied to plates 35*a* and 35*b*. As is conventional, the output of saw-tooth voltage generator 32 is arranged to be equally balanced with respect to the reference potential, so as to provide push-pull operation at plates 35*a* and 35*b*.

Electron gun or cathode 34 is connected to the negative terminal 39 of a direct-current source. Beam target 36 is connected through load resistor 40 to positive terminal 41 of the aforementioned direct-current source; beam target 37 is connected through load resistor 42 to positive terminal 41; and beam target 38 is connected through load resistor 43 to positive terminal 41. Beam target 36 is also connected through coupling condenser 44 to the input of a power amplifier and pulse inverter 45, the output of which constitutes the "red" gate output of gate-voltage generator 17; that is, the output of element 45 is connected to conductor 24 heretofore mentioned.

Beam target 37 is connected through coupling condenser 46 to a power amplifier and pulse inverter 47, identical to element 46. The output of element 47 is connected to conductor 26, heretofore mentioned, and constitutes the "blue" gate output of generator 17.

Beam target 38 is connected through coupling condenser 48 to the input of another power amplifier and pulse inverter, denoted 49, the output of which constitutes the "green" gate-voltage generator 17 and is hence connected to conductor 25, already described.

Elements 45, 47, and 49, each of which constitutes a power amplifier and pulse inverter, are entirely conventional and are accordingly shown on the drawing in block form. As will be more fully described in the following paragraphs, the voltage waveform at each of the beam targets 36, 37, and 38 is a train of negative pulses, and the effective source impedance of such pulses is exceedingly high. Thus power amplification of the pulses is necessary before they can be used for doing useful work, and it is also desirable in the embodiment of our invention now being described that they be reversed in polarity and made positive pulses. Also, a D.-C. bias must be provided so as to make the base line of the pulse train, or rectangular wave train as it might be called, a definite negative voltage.

The results just mentioned could be achieved readily by a three-tube circuit consisting of a cathode follower, a single conventional amplifier stage, and an output cathode follower in which the cathode-follower tube is operated with its cathode returned through its load resistor to a negative potential source. Many other circuit arrangements for accomplishing the same results will suggest themselves to persons skilled in the art. Since the structure of these devices is not claimed per se herein, it is believed that no further detailed description thereof is necessary.

The color-control gate-voltage generator 17 must, following a color coordination pulse, provide for a time interval approximately equal to one horizontal sweep of the cathode ray in the picture tube a positive gate voltage applied to the red zones on the screen, such voltage thus acting as red beam guide. It will be borne in mind, as previously mentioned, that during the time the positive voltage is applied to the red zones, the other color zones must be held at a negative potential. After one horizontal sweep following a color coordination pulse has been completed, the gate-voltage generator must restore the negative bias voltage to the red zones, at the same time placing a positive charge on the blue zones. Similarly, after the completion of the blue sweep on the picture tube, the gate-voltage generator must restore the negative bias on the blue zones and impose the positive gate voltage on the green zones, and so on. (It will be understood that the particular order of colors just recited is arbitrary, and any other color order may be adopted if desired.)

The structure shown in Fig. 6 accomplishes the results just defined by use of cathode-ray tube 33 as an electronic switch. Following any color coordination pulse, the sweep voltage applied to deflection plates 35*a* and 35*b* is at maximum negative value; that is, plate 35*b* is at maximum negative potential relative to plate 35*a*. This causes the cathode ray from electron gun 34 to be deflected to the left as tube 33 is viewed in Fig. 6, with the result that an electrical circuit is completed via beam target 36 through load resistor 40. The flow of the cathode-ray current through load resistor 40 causes a sharp drop in the potential at beam target 36, and the potential remains at its reduced value so long as the ray from gun 34 is striking target 36. Beam targets 36, 37, and 38 are designed to subtend equal arcs, and during a single saw-tooth sweep cycle, the ray from cathode 34 remains on each of the three beam targets an equal period of time. When the beam leaves target 36 and strikes target 37, the potential at target 36 returns to its maximum positive value and that at beam target 37 drops sharply. The potential at beam target 37 remains at a lowered value until the beam sweeps past target 37 and onto target 38, at which time the potential at target 37 returns to its maximum positive value and that at target 38 drops sharply. As may be seen from a study of Fig. 7, and from the diagrammatically indicated pulse symbols adjacent coupling condensers 44, 46, and 48 on Fig. 6, these rectangular waveforms bear to one another the phase relation previously defined as required for the output of gate-voltage generator 17. It is merely necessary that they be raised in power level and reversed in polarity. This is accomplished by elements 45, 47, and 49, and the resulting gate voltages, plotted relative to time on Fig. 7, are fed as beam guides to the various zones on the screen of the picture tube.

The sweep voltage of the color coordination tube 33 (denoted "$e_{cc}$" on Fig. 7) is controlled completely by the color coordination pulses, so that following each color coordination pulse it commences its sweep across the face of beam target 36. Accordingly, color synchronization or coordination is always assured, since a positive gate voltage guiding the beam to the red zones is always applied during those portions of the received signal which are transmitting "red" video information. Similarly, of course, perfect coordination exists between the gate voltages and the video information for the other colors.

In the foregoing description of our invention, it has been assumed that the beam would travel downward across the face of the screen by the width of one scanning line at a time—that is, it was assumed that the signal was non-interlaced. Adapting our invention to interlaced transmissions merely involves changing the order in which the gate voltages are applied to the color zones. In the illustrated case, for example, for reception of interlaced signals, the gate voltage should be applied to the zones in the order red, green, blue, instead of red, blue, green as heretofore assumed. In other words, the system would be prepared for receiving interlaced signals merely by connecting conductor 25 to the output of amplifier 47 and connecting conductor 26 to the output of amplifier 49.

It will be seen from a study of Fig. 2 that when the system has been modified as described in the previous paragraph, the correct color will at all times be provided by the gate voltages when the beam traverses every other line rather than successive lines.

The modification of our system of television reception for sequential field or sequential dot transmission merely involves appropriate reorientation of the color coordination pulses in the transmitted signal, and appropriate modification of the electronic switching operation in the color-control gate-voltage generator 17. While the gate voltages as shown are of duration equal to a single horizontal sweep of the beam in the picture tube, as is appropriate for sequential line color, the period of the gate voltages can obviously be set to any desired value, given appropriate synchronizing pulses from the transmitter. If sequential field color is desired, the duration of each gate voltage impulse may be made substantially equal to the duration of a vertical sweep-current cycle. On the other hand, should sequential dot transmission be used, the duration of the gate voltages can be made substantially less than the duration of one horizontal sweep.

When our invention is being employed with either sequential field or sequential dot transmission, it is desirable that a picture tube be employed in which the number of color zones is three times as great as the number of scanning lines being transmitted. This provides for each scanning line three zones—one of each color—and the particular zone traversed by the beam will depend on the particular gate voltage provided by generator 17 at the given instant.

Figure 10:
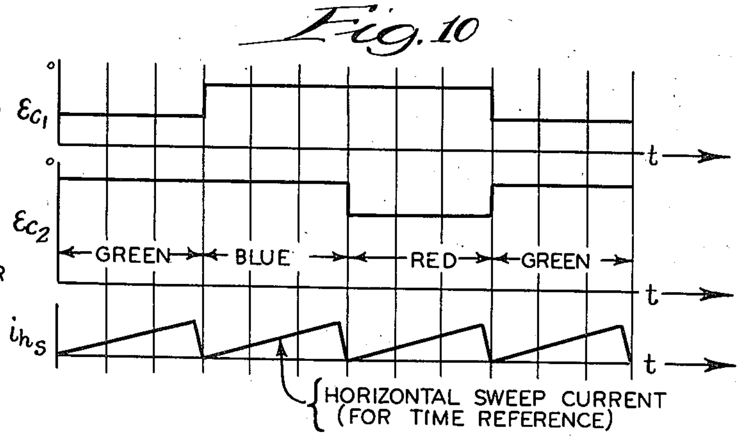

We have shown in Figs. 8–10 data pertaining to a modified form of our invention in which beam guiding is accomplished by the use of separate conducting strips which are interposed between the color zones at the rate of one every third color zone. As with our preferred embodiment heretofore described, and shown in Figs. 1–7, the color zones may be formed either by employing successive bands of phosphor designed to give off a distinctive color or by employing "white" phosphor in conjunction with color filter material. Whichever approach is followed in the structure of the tube screen, a narrow conducting strip, which may be a metallic deposit, is interposed among the color zones as indicated in Fig. 8. It is to be noted that in this modified form of our invention the color zones are arranged in alternating order; that is, in the example shown, they run red, blue, green, green, blue, red, and so on. Each pair of adjacent like colors is separated by a conductor. Half the conductors are connected together along one side of the screen and the other half of the conductors are connected together along the other side of the screen, as shown diagrammatically in Fig. 9.

In this embodiment the beam guiding is accomplished by applying negative gate voltages to the conductors. When one set of conductors is biased one unit negative and the other set of conductors is biased two or three units negative, the beam is urged to the zones nearest the less negatively charged set of conductors. When those conditions are reversed, the beam is urged toward the zones adjacent the other set of conductors. When both sets of conductors have a unit negative charge, the beam will be guided to the zone midway between the conductors.

A practical graphic illustration of the manner in which gate voltages may be applied to the two sets of conductors to achieve beam guidance may be seen in Fig. 10. The horizontal sweep current denoted "$i_{hs}$" is shown for time reference. As may be seen, during the first sweep-current cycle set one of the control conductors is biased doubly negative while set two has only a unit negative charge. As a result, the beam is urged toward the zones adjacent set two, and a green line is produced. During the second horizontal sweep cycle both sets of control conductors have unit negative charges, and as a result a blue line is produced. During the third horizontal sweep shown in Fig. 10, set one has a unit negative charge, while set two of the control conductors has a double negative charge. This causes the beam to be urged toward the red zones, and a red line is produced.

It may be seen that if the color-control gate-voltage be synchronized with the vertical sweep rather than the horizontal sweep, a sequential field color picture will be produced.

While we have in this specification shown and described two forms of guided-beam cathode-ray tubes, it will be obvious to those skilled in the art that many other physical forms of such tubes could be designed. For instance, fine metallic wires might be laid through the slots in which the color zones are formed by the use of dyestuff and phosphor, or by the use of phosphor treated to give off colored light. These fine wires would serve to charge the phosphor in accordance with the gate voltages just as do the thin metallic layers shown in Figs. 2–5. Alternatively, a wire "grid" might be suspended immediately to the rear of the laminated screen and the control voltages applied to them.

We do not desire to be limited to any particular physical style or conformation of cathode-ray tube design in the practice of our invention; our invention in its broadest aspect consists of a color television receiving system in which a laminated, multi-color screen is provided for the picture tube and positive means comprising electric fields are employed in synchronization with the transmitted signal to guide the beam during each portion of the video signal to a color zone appropriate to the video information being transmitted.

Accordingly, in view of the foregoing considerations, we desire that the embodiments of our invention herein shown and described be regarded as illustrative merely, and that the scope of our invention be determined primarily with reference to the appended claims.

As employed in the claims hereto appended, the term "color zone" means an elongated, narrow area on the screen of a cathode-ray tube coated with material, such as phosphor, which will emit light of some visible color when bombarded by electrons. The term "red zone" means a color zone which will emit red light when bombarded by electrons. Similarly, the term "blue zone" means a color zone which emits blue light when bombarded by electrons, and the term "green zone" means a color zone which will emit green light when bombarded by electrons. The term "emit," as used in the foregoing definitions, refers specifically to the light directed to the eye of an observer on the external or non-evacuated side of the viewing screen; it does not necessarily refer to the color of the light actually generated by the emitting material deposited within the zone.

We claim:

1. A cathode-ray tube having a viewing screen coated with stacked laminations of light-emitting material forming a plurality of red, blue, and green zones, systematically arranged across said viewing screen in a repeating pattern, said pattern comprising six zones, two of each color, arranged in back-to-back reverse order as, for example, red, blue, green, green, blue, red, an electrical conductor coextensive in length with said zones interposed between each pair of adjoined like colors, connecting means connecting together electrically one-half of said conductors, said half including every second conductor across the viewing screen, second connecting means connecting together electrically the other half of said conductors, each of said connecting means including a terminal external to the tube envelope permitting application of electrical charges to either set of conductors, whereby an electron beam can be guided in succession to zones of the three colors in turn by application of one periodic voltage to one set of conductors and a second periodic voltage to the other set of conductors.

2. A cathode-ray tube having a viewing screen provided with a plurality of laminations of light-emitting material disposed in parallel position across the face of said screen, said laminations forming a plurality of red, blue, and green zones systematically arranged in a repeating pattern of six zones, two of each color, in back-to-back reverse order as, for example, red, blue, green, green, blue, red, an electrical conductor, at least equal in length with the length of said zones, disposed between each pair of adjoined zones of like color, connecting means joining together electrically one-half of said conductors, said half including every second conductor across the face of said screen, second connecting means connecting together electrically the other half of said conductors, each of said connecting means including a terminal external to the tube envelope permitting application of a periodic voltage to one set of conductors and a second periodic voltage to the other set of conductors, whereby an electron beam can be guided in succession to zones of the three colors in turn.

3. Television-receiving apparatus comprising a cathode-ray tube according to claim 2 in combination with signal-detecting means and periodic-wave generator means operative responsively to and synchronously with said signal-detecting means to generate a first periodic voltage for application to one set of said conductors and a second periodic voltage for application to said second set of conductors.

4. A cathode-ray tube having a viewing screen provided with a plurality of laminations of light-emitting material disposed in parallel position across the face of said screen, said laminations forming a plurality of red, blue, and green zones systematically arranged in a repeating pattern of six zones, two of each color, in back-to-back reverse order as, for example, red, blue, green, green, blue, red, a system of electrical conductors electrically joined together and positioned relative to said zones to form a grid across the face thereof, a second similar system of electrical conductors forming a grid displaced with respect to said first grid in a direction normal to the longitudinal dimension of said zones and grids, and a pair of terminals external to the tube envelope respectively connected to the conductor systems, permitting application to both conductor systems of electrical charges, whereby an electron bean can be guided in succesion to zones of the three colors in turn by application of one periodic voltage to one terminal and a second periodic voltage to the other terminal.

5. Television-receiving apparatus comprising a cathode-ray tube according to claim 4 in combination with signal-detecting means and periodic-wave generator means operative responsively to and synchronously with said signal-detecting means to generate a first periodic voltage for application to one set of said conductors and a second periodic voltage for application to said second set of conductors.

MORTIMER L. SCHULTZ.
LOUIS G. PACENT.
RALPH R. BATCHER.

REFERENCES CITED

The following references are of record in the file of this patent:

UNITED STATES PATENTS

| Number | Name | Date |
|---|---|---|
| 1,467,132 | Bilstein | Sept. 4, 1923 |
| 1,934,821 | Rudenberg | Nov. 14, 1933 |
| 2,296,908 | Crosby | Sept. 29, 1942 |
| 2,307,188 | Bedford | Jan. 5, 1943 |
| 2,319,789 | Chambers | May 25, 1943 |
| 2,415,059 | Zworykin | Jan. 28, 1947 |
| 2,416,056 | Kallmann | Feb. 18, 1947 |
| 2,431,115 | Goldsmith | Nov. 18, 1947 |
| 2,446,249 | Schroeder | Aug. 2, 1948 |
| 2,446,440 | Swedlund | Aug. 3, 1948 |
| 2,446,791 | Schroeder | Aug. 10, 1948 |
| 2,461,515 | Bronwell | Feb. 15, 1949 |
| 2,490,812 | Huffman | Dec. 13, 1949 |
| 2,544,690 | Koch et al. | Mar. 13, 1951 |